United States Patent Office 2,983,690
Patented May 9, 1961

2,983,690

HIGH-SURFACE-AREA ALUMINA AND CATALYSTS CONTAINING SAME

Ralph J. Bertolacini, Chesterton, Ind., assignor to Standard Oil Company, Chicago, Ill., a corporation of Indiana No Drawing. Filed Apr. 29, 1958, Ser. No. 731,643

8 Claims. (Cl. 252—441)

This invention relates to alumina and more particularly to a method of irradiating hydrous alumina with gamma rays whereby the surface area and pore size of the resulting alumina after drying and calcining, are substantially altered.

Large quantities of alumina are used in present-day manufacturing operations, particularly in the chemical and petroleum field, as adsorbents, catalysts, and as supports for other catalytic materials. Among the important physical properties of such alumina are surface area, pore diameter, pore volume, pore-size distribution, and the like. Such properties are usually dependent upon the particular starting materials from which the alumina is prepared and also the particular method of alumina preparation. For any particular starting material and method of preparation, the surface area, pore size, and the like fall within a very narrow range. For example, alumina prepared by drying and calcining a Heard-type alumina hydrosol (Heard Reissue 22,196, October 6, 1942) normally has a surface area of about 225 to 240 square meters per gram.

For many purposes, however, it is desirable to adjust such properties of alumina to other than the normal ranges. For example, when selectively treating a particular size range molecule, it is often advantageous to have a particular alumina pore size. Another typical example is encountered when alumina is employed in a halide-containing platinum-alumina composite. When such composite is used in regenerative hydroforming (such as exemplified by Ultraforming—Petroleum Engineer, vol. XXVI, No. 4, April 1954, at page C-35), it has been found that the number of regenerations to which the catalyst can be subjected and, thus, catalyst life is limited by an economic minimum surface area. Each regeneration tends to decrease surface area slightly; thus, there is a substantial incentive to raise the surface area of the catalyst when freshly prepared so that the maximum number of regenerations and, thus, catalyst life is maximized. Increased surface area also has the advantage, under certain circumstances of increasing the retentivity by the catalyst of halogen activators, e.g., fluorine or chlorine.

The prior art teaches methods of adjusting surface area, pore volume, and the like. Unfortunately, such methods necessitate drastic techniques such as, for example, incorporating spacers which may or may not be removed by subsequent calcination, steaming, and the like. Such measures often are accompanied by undesired side effects, such as decreased crushing strength and attrition resistance of the alumina aggregate and destruction or modification of the catalytic properties of the alumina composite, for example, removal of activators, e.g., halogen, or changing the crystalline structure of the alumina itself, e.g., from the active gamma, eta, or chi phases to the inactive alpha phase.

It is therefore an object of the present invention to provide a method of adjusting, that is, increasing, surface area and/or pore volume of alumina during preparation. Another object is to prepare platinum-alumina composites of substantially increased surface area. These and other objects of the present invention will be apparent from the following detailed description thereof.

It has now been discovered that the surface area and pore volume of alumina can be substantially increased by subjecting the alumina when it is in the form of "hydrous alumina," as hereinafter defined, to gamma radiation. Thus, in accordance with the present invention, hydrous alumina is subjected to irradiation with gamma rays at dosage levels in excess of about $10^2$ rad, preferably about $10^4$ to $10^{12}$ rad, and thereafter dried and calcined. One or more catalytic substances, such as, for example, platinum, palladium, silica, molybdena, nickel, chromia, halogen (e.g., fluorine or chlorine) and the like may be incorporated into the hydrous alumina before or after irradiation or, alternatively, the resulting irradiated alumina, after drying and calcining, may be impregnated or otherwise mixed with such other catalytic substances.

Irradiation of hydrous alumina in accordance with the present invention is to be distinguished from irradiation of calcined alumina. While irradiation of calcined alumina may temporarily raise, for example, catalytic activity, possibly due to electrons or positive holes trapped in special sites in the alumina lattice, such treatment has no significant effect upon surface area, port volume, pore diameter and the like. Moreover, activity improvement associated with irradiation of calcined alumina, is only temporary and often disappears in a matter of hours. In contrast, increased surface area and pore volume resulting from irradiation of hydrous alumina does not disappear with the mere passage of time. Improved catalytic activity associated with such greater surface area is likewise "permanent."

The gamma rays or gamma radiation employed in the practice of the present invention is an electromagnetic form of irradiation with energy levels in the range of 0.01 to 2.5 million electron volts (m.e.v.), where an electron volt is the energy to bring one electron with its characteristic charge from a region of zero electrical potential to a region where the potential is one volt. In more familiar units one m.e.v. is $1.6 \times 10^{-6}$ ergs or $3.83 \times 10^{-14}$ calories. Wave lengths of gamma rays are roughly in the range of about $10^8$ to $10^{11}$ Angstroms. Gamma rays have sufficiently high energy levels and penetrating powers to bring about undefined changes in hydrous alumina, which, after drying and calcining, result in substantially greater surface area and pore volume. In contrast with gamma rays, lower-energy electromagnetic rays, such as X-rays and ultraviolet rays, and corpuscular radiation, such as alpha and beta particles, do not have sufficient energy levels and/or penetrating power to be operative in the practice of the present invention.

Gamma radiation employed in the present invention may be obtained from any conveniently available source. Such sources may be one or more radioactive elements, such as, natural radioactive elements (Ra, Th, Bi, and Co), artificial radioactive elements (Ta, Bd, Co, and P), or uranium fission products (e.g., Cs and Sr). Gamma radiation may also be obtained by bombardment of targets in particle accelerators, (e.g., cyclotron, synchrotron, betatron, and Van de Graff accelerators). In general, we prefer to use artificial radioactive elements, such as, cobalt-60, or uranium fission products, such as are available in the form of spent fuel elements from nuclear reactors.

For significant changes, the radiation dosage should be above about $10^2$ rad, where the rad represents 100 ergs/gram imparted by the ionizing particles to the irradiated material at the point of interest, which in the present invention is, of course, hydrous alumina. (For further discussion of the rad unit, see Nucleonics, 12, No. 1, 11 (1954).) In general, the increase in surface area, pore volume and the like of the resulting alumina varies roughly with the dosage of gamma radiation above about $10^2$ rad. As previously pointed out, preferred dosage is in the range of $10^4$ to $10^{12}$ rad. Dosages about $10^{12}$ rad do not appear to bring about substantial further increases in surface area, pore volume, and the like, although some improvement may be noted at such higher dosages. Ambient temperatures or temperatures above or below ambient temperatures may be employed during irradiation of the hydrous alumina. Atmospheric pressure or pressures about or below atmospheric pressure may also be employed. When irradiating hydrous alumina, some breakdown of water to hydrogen and oxygen is sometimes observed. Thus when the vessel containing the hydrous alumina is an enclosed vessel, the hydrogen and oxygen gases so released may raise pressures substantially above initial pressures, for example, from atmospheric pressure to as high as 1,000 p.s.i.g.

As previously pointed out, the present technique is applicable to the treatment of hydrous alumina, which for the purpose of the present invention is defined as alumina containing water of hydration, i.e., alumina containing 18 percent by weight, or more of water, e.g., alumina hydrosols, alumina hydrogels, alumina ultragels, alpha alumina trihydrate, beta alumina trihydrate, alpha alumina monohydrate, and the like. Hydrous alumina is therefore to be differentiated from alumina which has been dried below the monohydrate level, even though such dried alumina often contains substantial (e.g., 1–10 percent) chemi-sorbed water, e.g., chi, gamma and eta alumina (see "Alumina Properties," Technical Paper No. 10, revised, by A. S. Russell et al., copyright 1956, Aluminum Company of America). The fact that the present radiaton technique is applicable to alumina only when such alumina contains water of hydration suggests that the technique brings about a definite configuration in the alumina-water structure prior to dehydration. After dehydration, e.g., drying below a water content of about 18 percent by weight, such structural configuration apparently can no longer be substantially adjusted by radiation. The above explanation, however, is advanced as one possibility only, and I do not necessarily wish to be bound or limited in any way thereby.

A particularly advantageous type or hydrous alumina for use in practising the invention is alumina hydrosol prepared by the technique described in Heard Reissue 22,196 (October 6, 1942). According to this technique, aluminum metal in the form of sheets, granules, turnings, sawdust, chips shot, rings, irregular shapes, or the like is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent. The reaction goes forward readily at ordinary or autogenous pressures and at temperatures above about 100° F., preferably between about 125 and 160° F. Thick, viscous hydrosols can be obtained at temperatures above about 160° F., while relatively thin hydrosols, which are preferred, are obtained at temperatures below about 160° F. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrous alumina product is a syrupy liquid of opalescent, nearly transparent appearance, containing from around 2 to 10 percent by weight of $Al_2O_3$.

The hydrous alumina, prepared as described above, may be treated in accordance with the present invention directly. Alternatively, an electrolyte, e.g., ammonium hydroxide, may be added to convert the hydrosol to a gel, or, at high pH's, i.e., pH's in excess of 8.5, to convert the hydrosol to a precipitate of solid hydrous alumina, which may then be irradiated. After irradiation the hydrous alumina may be dried, e.g., at about 200 to 600° F. for 1 to 24 hours, and calcined, e.g., at about 600 to 1200° F. for about 1 to 24 hours. The drying and calcining may be carried out as one continuous step, that is, by raising temperature over a period of time until calcination temperatures are reached. Subjecting hydrous alumina to calcination temperatures without preliminary drying is not advisable because rapid release of water of hydration may create internal pressures within the alumina, and thus lead to fissures, cracks, and the like.

The alumina produced in accordance with the present invention can be prepared in any of the usual mechanical forms. It can be ground to a powder for use in fluidized form. It can be broken into irregular fragments. It can be prepared in various shapes, such as pills, pellets, rings, rosettes, saddles, and the like as desired. It is suitable per se as a catalyst for various processes, such as the dehydration of alcohols, the reaction of methanol and ammonia to produce methylamines, the vapor phase finishing of synthetic gasolines, and the like. As previously noted, the alumina is also a highly-satisfactory support for one or more catalytic materials, such as molybdena, chromia, platinum, palladium, nickel, silica, halogens, and the like. The addition of such other catalytic substances is conveniently carried out before or after the irradiation, preferably after, according to the techniques described in the art, e.g., co-gelling, impregnation and the like. In all cases the resulting catalyst will have a larger pore volume and surface area than would be obtainable without the irradiation step.

Alumina of increased pore volume size and surface area is broadly useful for the conversion of hydrocarbons, e.g., reforming, isomerization, hydrogenation, hydrocracking, dehydrogenation, and other reactions known in the art. The required processing conditions depend upon the specific reactions the charging stocks involved, and the presence or absence of other catalytic materials, and may readily be determined from the teachings of the prior-art. By adjusting pore size of alumina in accordance with the present invention, reaction of molecules of certain sizes, that is, molecules which fit within the adjusted pores, may be favored. For such purposes the pores of the alumina usually contain other catalytic substances, as described above. Alumina of adjusted pore size may also be advantageously used for separation purposes, e.g., as a molecular sieve.

When employing the improved alumina of the present invention in a halogen-containing platinum-alumina hydroforming catalyst, about 0.01 to 1.0 percent of weight of platinum and about 0.05 to 2 percent by weight of halogen, usually chlorine or fluorine, are incorporated during manufacture. The platinum and halogen may be incorporated separately, or together; and when incorporated together, it is conveniently done so by employing a halogen-containing platinum compound, e.g., chloroplatinic acid, platinum tetrachloride, platinous chloride, platinic fluoride, and the like. For such purposes, the halogen and/or platinum may be incorporated before or after irradiation of the hydrous alumina or after the hydrous alumina is dried and calcined. In a specific embodiment, chloroplatinic acid is co-gelled with Heard-type alumina hydrosol, the resulting co-gelled mixture is irradiated with gamma rays to a dosage in a range of about $10^4$ to $10^{12}$ rad, and the resulting irradiated mixture is thereafter dried and calcined. The resulting catalyst may contain about 0.6 percent by weight of platinum and about 0.6 percent by weight of chlorine. It exhibits very-high activity when employed as a catalyst for upgrading petroleum naphthas under reforming conditions (e.g., 800–1050° F., 100–1200 p.s.i.g., 0.5 to 5.0 weight-hourly space velocity, and hydrogen recycle rate of 1000–10,000 standard cubic feet per barrel of naphtha charged).

The following specific example will more clearly illustrate the technique and advantages of the present invention.

*Example*

A Heard type alumina hydrosol was prepared by reacting metallic aluminum with water in the presence of mercuric oxide and dilute acetic acid. The resulting hydrosol contained 6.4 percent by weight of $Al_2O_3$. One portion of the resulting hydrosol was dried for about 4 hours at 400° F. and then calcined for about 6 hours at 1000° F. Another portion of the hydrosol was subjected to gamma radiation in accordance with the present invention, as detailed below, and was then dried and calcined in the same manner as the first portion. Surface area and pore volume of the resulting gamma-type aluminas were then determined and pore diameter derived therefrom. The results for both alumina preparations are presented hereinafter for comparison.

The portion of the alumina hydrosol which was subjected to gamma irradiation was a one-liter portion which was placed in a sealed, stainless-steel bomb. Prior to irradiation, the temperature of the bomb was ambient temperature and pressure was atmospheric pressure. The source of the gamma rays was a spent fuel rod from a nuclear reactor, and the radiation dosage was about $10^8$ rad. As the result of decomposition of water in the hydrosol to form hydrogen and oxygen, pressure in the bomb increased during the irradiation from essentially atmospheric to about 200 p.s.i.g.

The results are as follows:

| Irradiated | Surface Area, $M.^2$/Gram | Micro-Pore Vol. cc/Gram | Avg. Pore Dia., Angstroms |
|---|---|---|---|
| Yes | 349 | 0.519 | 59.5 |
| No | 231 | 0.433 | 75.1 |

The above results clearly demonstrate the remarkable increase in surface area and pore volume and consequent decrease in pore diameter, associated with the present invention. When platinum and chlorine are incorporated into the resulting alumina by impregnation with chloroplatinic acid, activity of the resulting catalyst when employed for reforming petroleum naphthas is substantially increased. Moreover, the number of regenerations to which the catalyst can be subjected before surface area falls below levels which make further operations uneconomic, is more than doubled. At the same time chloride retention by the catalyst is substantially improved.

While the invention has been described with reference to certain specific examples and operating embodiments, it is to be understood that such examples and embodiments are illustrative only and not by way of limitations. Numerous additional embodiments of the invention will be apparent from the foregoing description to those skilled in the art.

In accordance with the foregoing description, what is claimed is:

1. A method of preparing alumina of increased surface area which comprises irradiating hydrous alumina with gamma rays to dosage levels of at least about $10^2$ rad, thereafter drying and calcining.

2. The method of claim 1 including the step of incorporating another catalytic substance into the hydrous alumina prior to drying and calcining.

3. The method of claim 2 wherein said another catalytic substance is 0.01 to 1.0 percent by weight of platinum, based on dry $Al_2O_3$, and said platinum is incorporated into the hydrous alumina prior to irradiating said alumina.

4. A method of increasing the surface area and micropore volume and decreasing the average pore diameter of alumina which comprises irradiating hydrous alumina with $10^4$ to $10^{12}$ rad of gamma radiation, thereafter drying and calcining.

5. In the method of preparing alumina which comprises drying and calcining hydrous alumina, the improvement which comprises subjecting the hydrous alumina, prior to drying and calcining, to about $10^4$ to $10^{12}$ rad dosage of gamma radiation, whereby an alumina of increased surface area is obtained.

6. A method of preparing halide-containing platinum-alumina catalyst of increased surface area and improved halide retention which comprises irradiating hydrous alumina with gamma rays to a dosage level of about $10^4$ to $10^{12}$ rad, drying and calcining the resulting hydrous alumina, and introducing into the dried and calcined alumina about 0.01 to 1.0 percent by weight of platinum and about 0.05 to 2 percent by weight of halogen.

7. A method of preparing a platinum-alumina catalyst of increased surface area which comprises irradiating hydrous alumina with about $10^4$ to $10^{12}$ rad of gamma radiation, co-gelling a platinum compound with the hydrous alumina to platinum levels of about 0.01 to 1.0 percent by weight, based on $Al_2O_3$, thereafter drying and calcining.

8. The method of claim 7 wherein the platinum compound is co-gelled with the hydrous alumina prior to irradiating the hydrous alumina.

References Cited in the file of this patent

UNITED STATES PATENTS 2,582,428    Haensel _____ Jan. 15, 1952

OTHER REFERENCES

J.A.C.S., vol. 79, No. 1, pp. 252 and 253, Jan. 5, 1957.